(12) United States Patent
Yoshida et al.

(10) Patent No.: US 8,929,671 B2
(45) Date of Patent: Jan. 6, 2015

(54) IMAGE PROCESSING APPARATUS AND INTERPOLATION FRAME GENERATING METHOD

(75) Inventors: Atsushi Yoshida, Yokohama (JP); Hideki Aiba, Moriya (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 317 days.

(21) Appl. No.: 13/483,588

(22) Filed: May 30, 2012

(65) Prior Publication Data

US 2012/0308083 A1  Dec. 6, 2012

(30) Foreign Application Priority Data

May 30, 2011  (JP) ................. P2011-119928

(51) Int. Cl.
*G06K 9/36*  (2006.01)
*H04N 7/01*  (2006.01)

(52) U.S. Cl.
CPC .................. *H04N 7/014* (2013.01)
USPC ............... 382/236; 382/300; 348/441

(58) Field of Classification Search
None
See application file for complete search history.

(56) References Cited

U.S. PATENT DOCUMENTS

| | | | | | |
|---|---|---|---|---|---|
| 4,992,870 | A | * | 2/1991 | Samad | 348/441 |
| 6,058,212 | A | * | 5/2000 | Yokoyama | 382/236 |
| 6,148,115 | A | * | 11/2000 | Mackinnon et al. | 382/266 |
| 2005/0243933 | A1 | * | 11/2005 | Landsiedel et al. | 375/240.16 |
| 2008/0239143 | A1 | * | 10/2008 | Shin et al. | 348/416.1 |
| 2009/0046208 | A1 | * | 2/2009 | Kwon et al. | 348/700 |
| 2009/0135909 | A1 | * | 5/2009 | Chen et al. | 375/240.16 |
| 2009/0310679 | A1 | * | 12/2009 | Chang et al. | 375/240.16 |
| 2010/0098349 | A1 | * | 4/2010 | Arashima et al. | 382/263 |
| 2010/0118185 | A1 | * | 5/2010 | Furukawa et al. | 348/452 |
| 2011/0032431 | A1 | * | 2/2011 | Tsai et al. | 348/699 |
| 2011/0285902 | A1 | * | 11/2011 | Hoshino | 348/441 |

FOREIGN PATENT DOCUMENTS

| | | | |
|---|---|---|---|
| CN | 1652608 | A | 8/2005 |
| CN | 101523475 | A | 9/2009 |
| JP | 2004-320279 | A | 11/2004 |
| JP | 2008-118620 | A | 5/2008 |
| JP | 2008118505 | A * | 5/2008 |
| JP | 2008-245135 | A | 10/2008 |
| JP | 2010-278760 | A | 12/2010 |

OTHER PUBLICATIONS

Official Action issued on Sep. 2, 2014 in the counterpart Japanese application No. 2011-119928.
Official Action issued on Jun. 4, 2014 in the counterpart Chinese application No. 201210175125.9.

* cited by examiner

*Primary Examiner* — Wenpeng Chen
(74) *Attorney, Agent, or Firm* — Nath, Goldberg & Meyer; Jerald L. Meyer; Stanley N. Protigal

(57) ABSTRACT

An image processing apparatus includes a frame memory, a motion vector detector, a screen edge detector and an interpolation frame generator. The frame memory frame-delays an input signal and outputs the input signal as a delayed input signal. The motion vector detector detects a motion vector between frames based on the input signal and the delayed input signal. The screen edge detector detects a pixel corresponding to a screen edge in the input signal. The interpolation frame generator generates an interpolation frame from the input signal and delayed input signal based on the motion vector and the pixel corresponding to the screen edge. The interpolation frame generator generates the interpolation frame using the pixel corresponding to the screen edge or the pixel inside relative to the pixel corresponding to the screen edge when the motion vector points a pixel outside relative to the pixel corresponding to the screen edge.

5 Claims, 6 Drawing Sheets

IMAGE PROCESSING APPARATUS AND INTERPOLATION FRAME GENERATING METHOD

CROSS REFERENCE TO RELATED APPLICATION

This application claims benefit of priority under 35 U.S.C. §119 to Japanese Patent Application No. 2011-119928 filed on May 30, 2011, the entire contents of which are incorporated by reference herein.

BACKGROUND OF THE INVENTION

1. Field of the Invention

The present invention relates to an image processing apparatus and an interpolation frame generating method that generate an interpolation frame between frames of an input image.

2. Description of the Related Art

Recently, in an image processing apparatus such as television, it is becoming common to insert an interpolation frame between frames of an input image and to output the image. In this way, the image is output at a frame rate higher than the input frame rate, which provides a moving image which is smooth and has a small blurring. It is common that the interpolation frame to be inserted is generated based on the previous and subsequent frames and a motion vector between the frames which is estimated from the difference between continuous frames of the input image (see Patent Literature 1: Japanese Unexamined Patent Application Publication No. 2008-245135 and Patent Literature 2: Japanese Unexamined Patent Application Publication No. 2010-278760).

Incidentally, in a case of generating each pixel of an interpolation frame, it is assumed that a target pixel is present in a frame of interpolation source. Thus, when a target pixel is not present in a frame of interpolation source, precision of interpolation will be lowered. This generates a frame which provides a feeling of strangeness to a viewer of the image. Such feeling of strangeness remarkably occurs at the screen edge (edge portion of the screen).

That is, when an object is moving at the screen edge, there may be a case where the original pixel is not present on the screen in one of the previous and subsequent frames, which are the interpolation source of the interpolation frame, by the object fading in or out of the screen and going outside of the screen. If the outside-screen pixel is used for the interpolation source as is, an interpolation error may occur since an ordinary image data is generally not present outside the screen.

Thus, according to the Patent Literature 1, in order to avoid using the outside-screen pixels as the interpolation source, only one of the previous and subsequent frames is used as the interpolation source at the screen edge. That is, as shown in FIG. 1, a pixel of the subsequent frame if where a motion vector denoted by a broken line points the outside-screen pixel is not used, and only a pixel of the previous frame 0f where a motion vector points the inside-screen pixel is used. In this method, when the detection precision of the motion vector is not high, a sharp change occurs at the boundary between the interpolation pixel generated by using two frames and the interpolation pixel generated by using only one frame, which enhances a risk of causing the feeling of strangeness felt by the viewer of the image.

SUMMARY OF THE INVENTION

The present invention has been made for solving the above problem. It is an object of the present invention to provide an image processing apparatus and an interpolation frame generating method capable of precisely carrying out the interpolation even at a screen edge.

For solving the above problem, an image processing apparatus according to an embodiment of the present invention includes: an input unit that inputs an input signal; a frame memory that frame-delays the input signal input by the input unit and outputs the input signal as a delayed input signal; a motion vector detector that detects a motion vector between frames based on the input signal input by the input unit and the delayed input signal; a screen edge detector that detects a pixel corresponding to a screen edge in the input signal input by the input unit; and an interpolation frame generator that generates an interpolation frame from the input signal input by the input unit and the delayed input signal, based on the motion vector detected by the motion vector detector and the pixel corresponding to the screen edge detected by the screen edge detector, wherein when the motion vector points a pixel located outside with respect to the pixel corresponding to the screen edge, the interpolation frame generator generates the interpolation frame using the pixel corresponding to the screen edge or a pixel located inside with respect to the pixel corresponding to the screen edge.

For solving the above problem, an interpolation frame generating method according to an embodiment of the present invention includes: inputting an input signal; generating a delayed input signal from the input signal; detecting a motion vector between frames based on the input signal and the delayed input signal; detecting a pixel corresponding to a screen edge in the input signal; and generating an interpolation frame from the input signal and the delayed input signal based on the motion vector detected by the motion vector detecting and the pixel corresponding to the screen edge detected by the screen edge detecting, wherein when the motion vector points a pixel located outside with respect to the pixel corresponding to the screen edge, the interpolation frame generating generates the interpolation frame using the pixel corresponding to the screen edge or a pixel located inside with respect to the pixel corresponding to the screen edge.

According to the present invention, when the motion vector points the region outside the screen edge, it is so controlled that the motion vector points the screen-edge, thereby making it possible to provide an image processing apparatus and an interpolation frame generating method which are capable of precisely carrying out the interpolating at the screen edge also.

DESCRIPTION OF THE EMBODIMENTS

Figure 1:
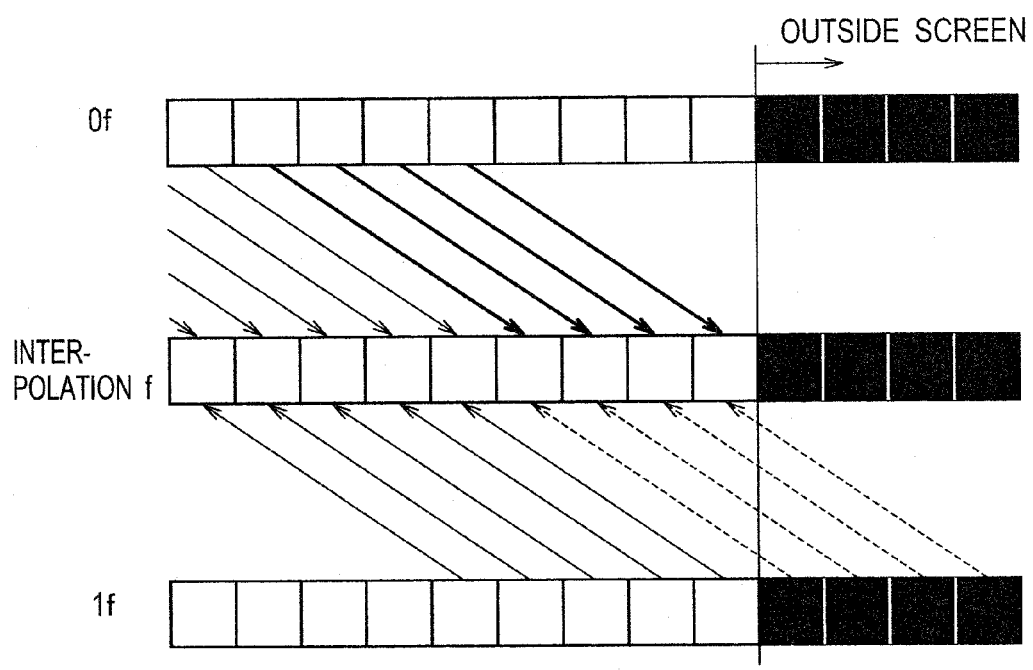
FIG. 1 is a drawing that illustrates an interpolation frame generation processing according to a conventional technology.

Embodiments of the present invention will be described below in detail by referring to the drawings.

First Embodiment

Figure 2:
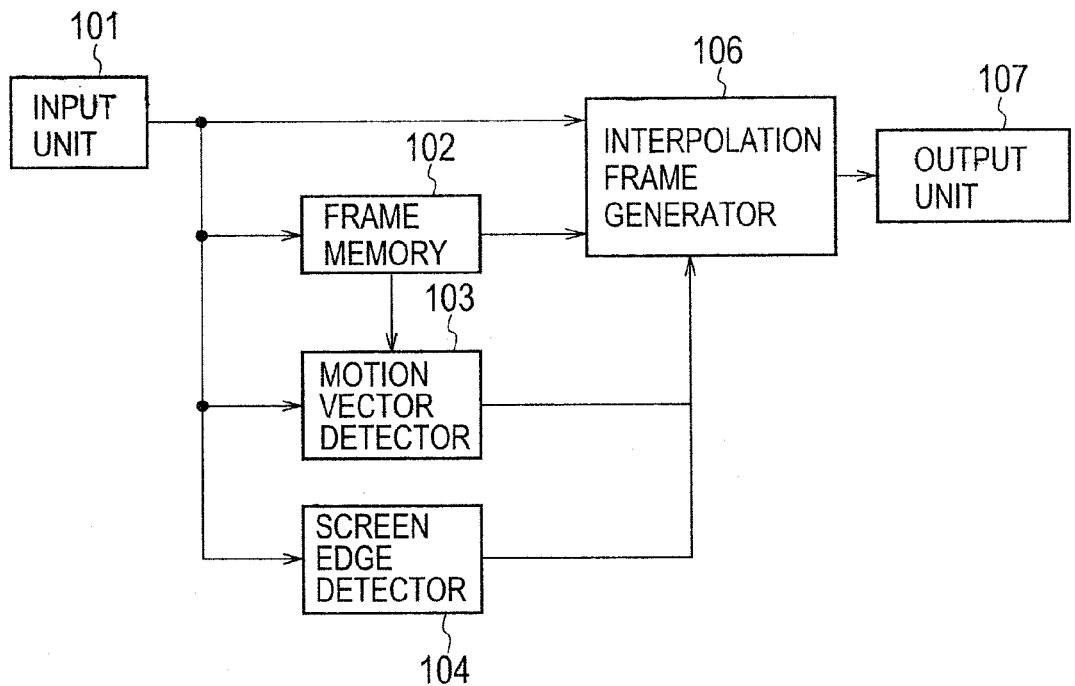
FIG. 2 is a structural diagram of an image processing apparatus according to a first embodiment of the present invention.

FIG. 2 is a structural diagram of an image processing apparatus according to a first embodiment. This image processing apparatus is a television or the like that inserts an interpolation frame between frames of an input signal and outputs the signal. As shown in FIG. 2, the image processing apparatus includes an input unit 101, a frame memory 102, a motion vector detector 103, a screen edge detector 104, an interpolation frame generator 106 and an output unit 107.

The input unit 101 receives an input signal such as an image. The frame memory 102 delays the input signal input by the input unit 101, by one frame or a plurality of frames, and then outputs the input signal as a delayed input signal. The motion vector detector 103 detects a motion vector between frames based on the input signal input by the input unit 101 and the frame-delayed signal delayed by the frame memory 102. The screen edge detector 104 detects a screen edge of the input signal input by the input unit 101. The interpolation frame generator 106 generates an interpolation frame between frames based on the motion vector detected by the motion vector detector 103 and the screen edge detected by the screen edge detector 104, and properly inserts the generated interpolation frame between the frames of the input signal. The output unit 107 outputs output signals in which the interpolation frame generated by the interpolation frame generator 106 is properly inserted between the frames constituting the input signal.

Here, the screen edge detector 104 essentially detects, as pixels (or positions) that constitute a screen edge, upper-lower and right-left edges of an effective pixel region of the input signal. However, depending on an input signal, there may be several pixels on which a black is provided, at the screen edge even within the effective pixel region. In order to deal with such an input signal, pixels shifted inward by an arbitrary number of pixels (within the effective pixel region) from the pixels at the upper-lower and right-left edges of the effective pixel region (the edges of the effective pixel region), may be detected as the screen edge. That is, the "screen edge" is an edge portion of the screen, which more specifically denotes pixels at the upper-lower and right-left edges of the effective pixel region or pixels shifted inward by an arbitrary number of pixels from the upper-lower and right-left edges of the effective pixel region.

Figure 3:
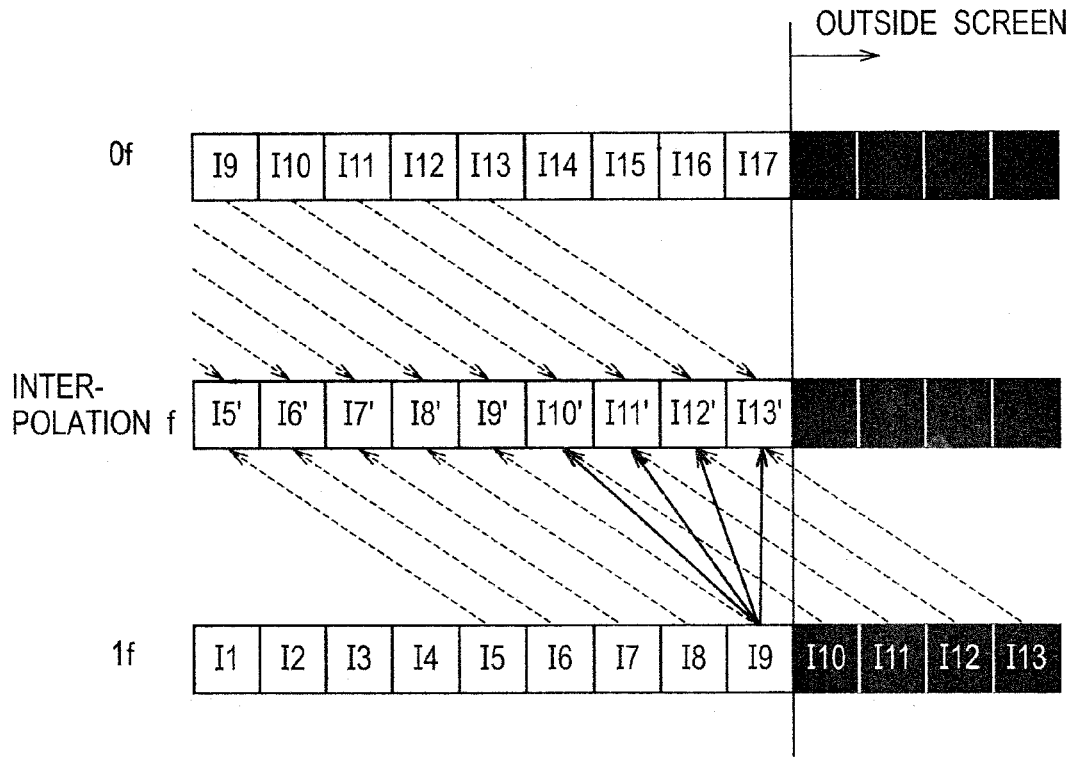
FIG. 3 is a drawing that illustrates an interpolation frame generation processing according to the first embodiment of the present invention.

The interpolation frame generation processing of the interpolation frame generator 106 according to the first embodiment will be described below in detail, with reference to FIG. 3. In FIG. 3, a delayed input signal which is delayed at the frame memory 102 and input to the interpolation frame generator 106 is defined as a previous frame $0f$. Further, a present input signal which is directly input to the interpolation frame generator 106 is defined as a subsequent frame $1f$. Moreover, the interpolation frame generated by the interpolation frame generator 106 from the previous frame $0f$ and the subsequent frame if is defined as an interpolation f. Here, a case is assumed in which an object is moving at the screen edge, and the object fades out and goes out of the screen in the subsequent frame if of the interpolation frame (interpolation f), which indicates that original pixels are not present on the screen. One rectangle corresponds to one pixel.

In FIG. 3, a motion vector detected from the previous frame $0f$ and subsequent frame if is denoted by a broken line. A pixel I9 in the previous frame $0f$ has moved to a position of a pixel I9 in the subsequent frame $1f$. An interpolation pixel I9' in the interpolation f is generated from the pixel I9 in the previous frame $0f$ and the pixel I9 in the subsequent frame $1f$, and is positioned in the middle between the position of the pixel I9 in the previous frame $0f$ and the position of the pixel I9 in the subsequent frame $1f$.

A pixel I10 in the previous frame $0f$ has moved to a position of a pixel I10 in the subsequent frame $1f$. As shown in FIG. 3, the pixel I10 in the subsequent frame if is located outside the screen. In this case, when a pixel I10' in the interpolation f is generated, a problem occurs in which no usable original pixel is present since the pixel I10 in the subsequent frame if is an outside-screen pixel.

Figure 4:
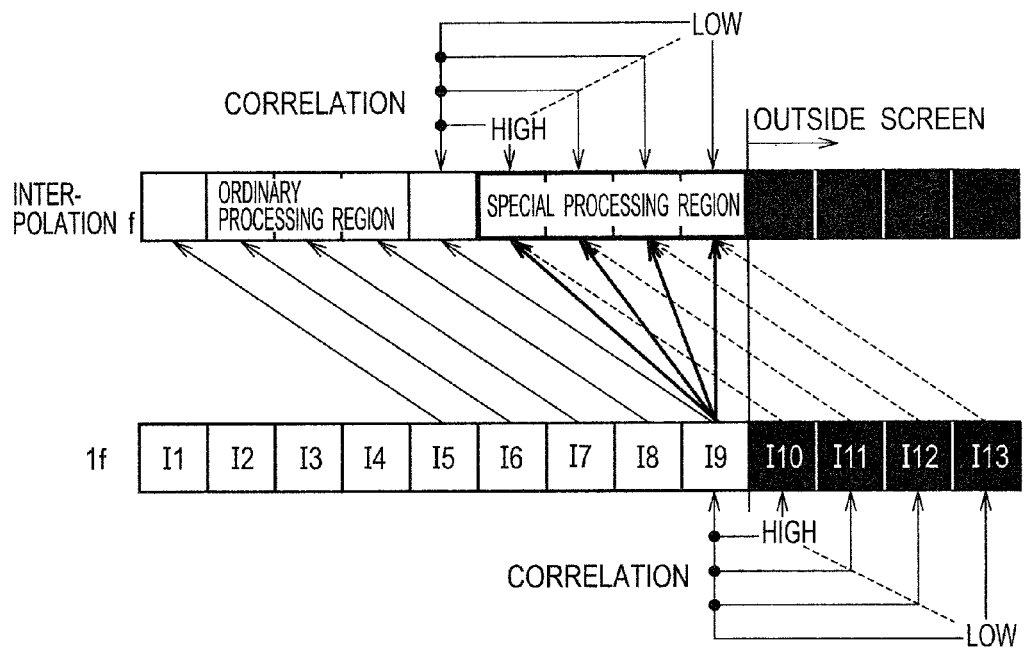
FIG. 4 is a drawing that illustrates a correlation between screen-edge pixels and outside-screen pixels according to the first embodiment of the present invention.

FIG. 4 shows a correlation between the screen-edge pixels and the outside-screen pixels which are pointed by motion vectors, in the subsequent frame if where the motion vectors point the outside-screen. That is, the correlation between the pixel I9 at the outermost edge in the screen of the subsequent frame if and the four outside-screen pixels I10 to I13 changes from being high to being low according to the mutual distances. In the first embodiment, when motion vectors point the four outside-screen pixels I10 to I13, the pixel I9 at the outermost edge within the screen is used to replace all of the four outside-screen pixels I10 to I13 by the pixel I9. In this way, the region where the pixel I9 at the outermost edge in the screen was used to replace the outside-screen pixels by the pixel I9 is called a "special processing region". In contrast, the region where an ordinary processing is carried out without the replacement is called an "ordinary processing region". A pixel used as an interpolation source of the interpolation pixels in the special processing region may be the screen-edge pixel (pixel at the outermost edge within the screen) or the pixel located inside with respect to the screen-edge pixel. Since the screen-edge pixel has the highest correlation to the outside-screen pixels among pixels within the screen, the screen-edge pixel is preferable as the pixel of the interpolation source.

It is assumed that motion vectors in the zone of the screen edge are constant. As shown in FIG. 3, in the previous frame $0f$, since the motion vectors of the pixels I10 to I13 which will be used as the interpolation sources of the pixels I10' to I13' in the special processing region of the interpolation f point the region within the screen in the interpolation f, the pixels I10 to I13 based on the motion vectors are adopted as the interpolation sources by the same method as the ordinary processing. In contrast, in the subsequent frame $1f$, since the pixels I10 to I13 which will be used as the interpolation sources based on the motion vectors are present outside the screen, the screen-edge pixel or the pixel located inside with respect to the screen-edge pixel (pixel I9 in the first embodiment) is adopted as the interpolation sources. In general, the screen-edge pixel I9 has the highest correlation with the pixels I10 to I13 located outside the screen among the pixels within the screen, and thus, adopting the screen-edge pixel I9 as the interpolation source can reduce the processing difference at the boundary between the ordinary processing region and the special processing region.

As it approaches the pixel I13' at the screen edge of the interpolation f, the correlation becomes lower because the distance between the pixel where an original interpolation source of each pixel is present and the screen-edge pixel becomes gradually larger. However, since such change is gradual rather than sharp and interpolation pixels within the screen based on the original motion vectors are used in the previous frame 0f as the interpolation sources, it is unlikely that a sharp change is caused at the boundary between the ordinary processing region and the special processing region. This makes it possible to obtain an interpolation result which gives the viewer a small feeling of strangeness.

As described above, with the image processing apparatus according to the first embodiment, it is so controlled that the screen-edge pixel or the pixel located inside with respect to the screen-edge pixel is used as the interpolation source when the motion vector points the region located outside the screen edge, thus making it possible to precisely carry out the interpolating at the screen edge also.

Second Embodiment

Figure 5:
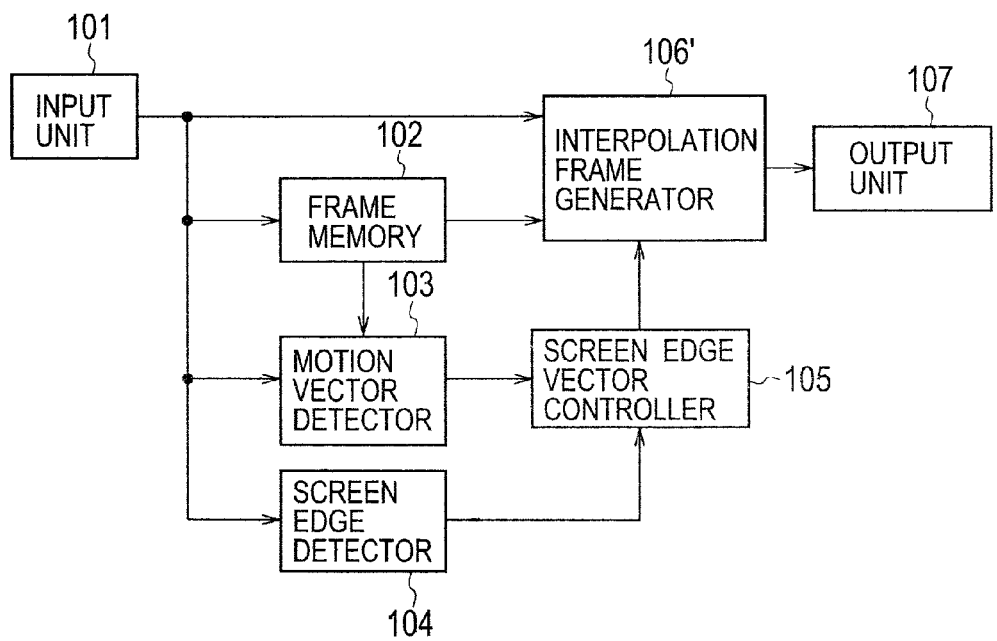
FIG. 5 is a structural diagram of an image processing apparatus according to a second embodiment of the present invention.

FIG. 5 is a structural diagram of an image processing apparatus according to a second embodiment. This image processing apparatus is basically similar to the first embodiment except that a screen edge vector controller 105 is provided for controlling a motion vector detected by the motion vector detector 103.

More specifically, when a motion vector detected by the motion vector detector 103 points a pixel located outside a screen edge detected by the screen edge detector 104, the screen edge vector controller 105 controls such that the motion vector points a screen-edge pixel or a pixel located inside with respect to the screen-edge pixel. By this, based on the motion vector controlled by the screen edge vector controller 105, an interpolation frame generator 106' generates an interpolation frame using the screen-edge pixel or the pixel located inside with respect to the screen-edge pixel. The screen edge vector controller 105 does not carry out the processing when a motion vector points a pixel within the screen.

As described above, with the image processing apparatus according to the second embodiment, when the motion vector points a region located outside the screen edge, it is so controlled that the motion vector points the screen-edge pixel or the pixel located inside with respect to the screen-edge pixel, thereby making it possible to precisely carry out the interpolating at the screen edge also.

Third Embodiment

Figure 6:
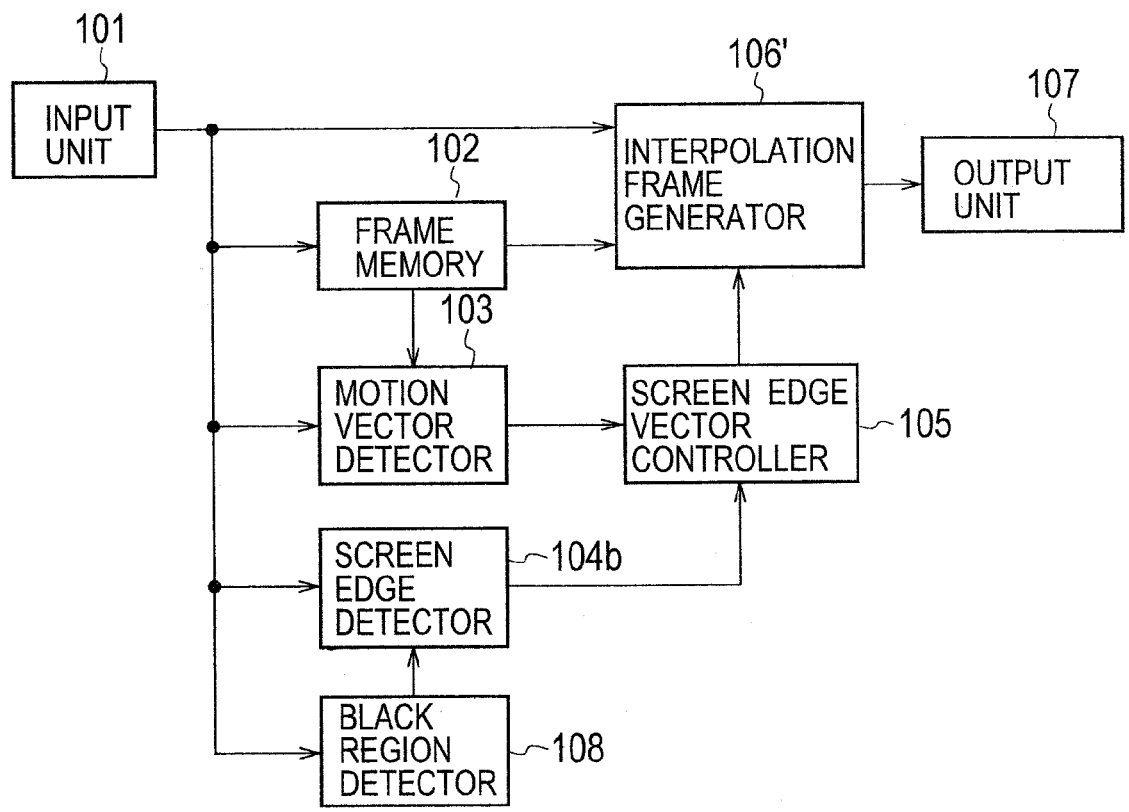
FIG. 6 is a structural diagram of an image processing apparatus according to a third embodiment of the present invention.

FIG. 6 is a structural diagram of an image processing apparatus according to a third embodiment. This image processing apparatus is basically similar to the first embodiment except that a black region detector 108 is provided for detecting a black region (region occupied by black) within the effective pixel region of the input signal. Further, a screen edge detector 104b treats the black region detected by the black region detector 108 as a region located outside the screen, and detects a pixel located inside with respect to the black region as the screen-edge pixel.

Figure 7:
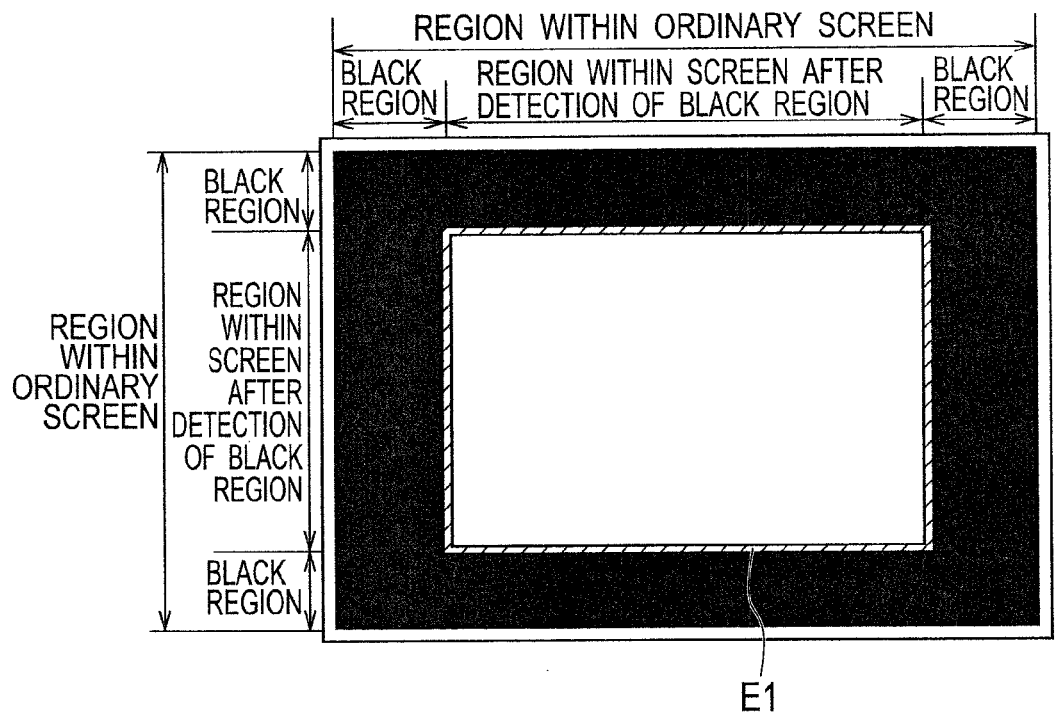
FIG. 7 is a drawing that illustrates a black region according to the third embodiment of the present invention.

Specifically, as shown in FIG. 7, when the black region detector 108 detects the black region at the upper-lower and the right-left edges within the effective pixel region, it treats the black region as a region located outside the screen. For example, in images such as movie, there may be cases in which the upper and lower parts of the screen are cut. Further, when viewing an image generated at an aspect ratio of 4:3 in a display having an aspect ratio of 16:9, there may be cases in which right and left parts of the image are cut. In these cases, as shown in FIG. 7, it is made such that a screen edge E1 can be set in accordance with the cut region.

As described above, with the image processing apparatus according to the third embodiment, it is so made that a part located inside with respect to the black region within the effective pixel region of the input signal is detected as the screen edge, and thus, a pixel in this black region is not used for the interpolation. By this, the interpolation can be precisely carried out at the screen edge even when the black region is present within the effective pixel region.

Fourth Embodiment

Figure 8:
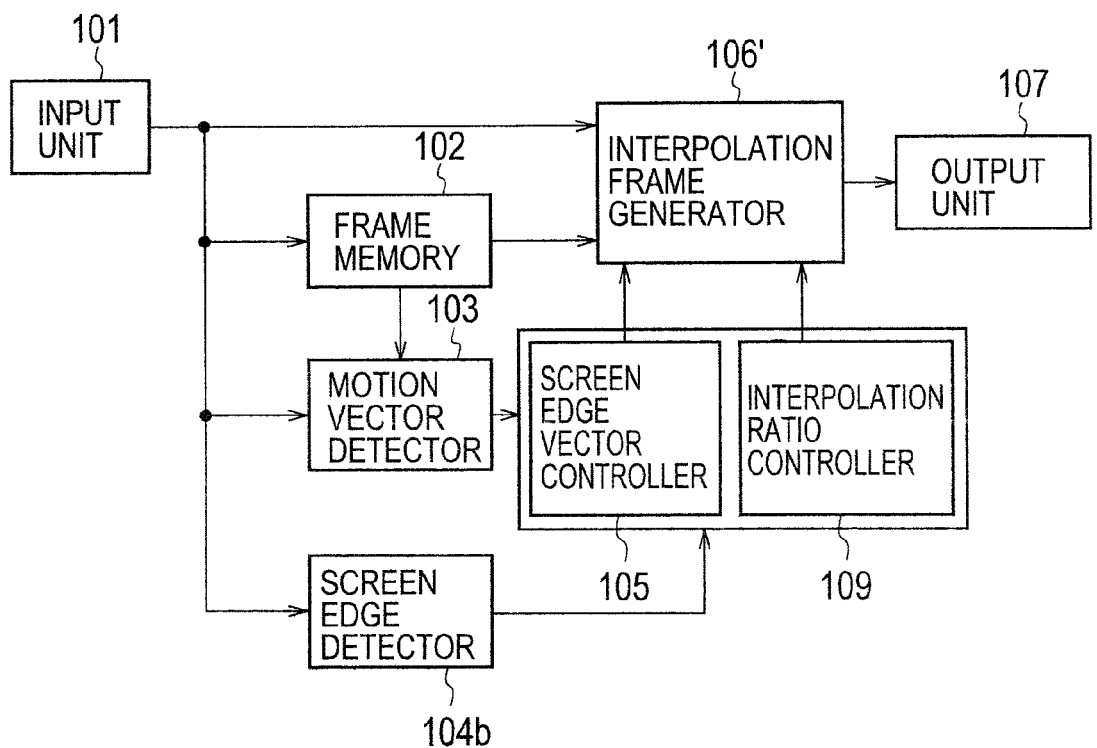
FIG. 8 is a structural diagram of an image processing apparatus according to a fourth embodiment of the present invention.

FIG. 8 is a structural diagram of the image processing apparatus according to a fourth embodiment. This image processing apparatus is basically similar to the first embodiment except that, as shown in FIG. 8, an interpolation ratio controller 109 is provided for controlling an interpolation ratio based on a motion vector detected by the motion vector detector 103 and a screen edge detected by the screen edge detector 104b. The interpolation ratio is defined as a use ratio of two frames of the interpolation source. In other words, it is defined as a use ratio of two pixels in generating the interpolation pixel. The interpolation frame generator 106' generates the interpolation frame based on the interpolation ratio from the interpolation ratio controller 109.

The interpolation frame generation processing according to the fourth embodiment will be described below in detail. Since reliability of the interpolation increases as the correlation becomes higher, the pixel having the high correlation is adopted for the interpolation at a ratio similar to that of the ordinary processing while the pixel having the low correlation is adopted for the interpolation at a lower ratio.

Figure 9:
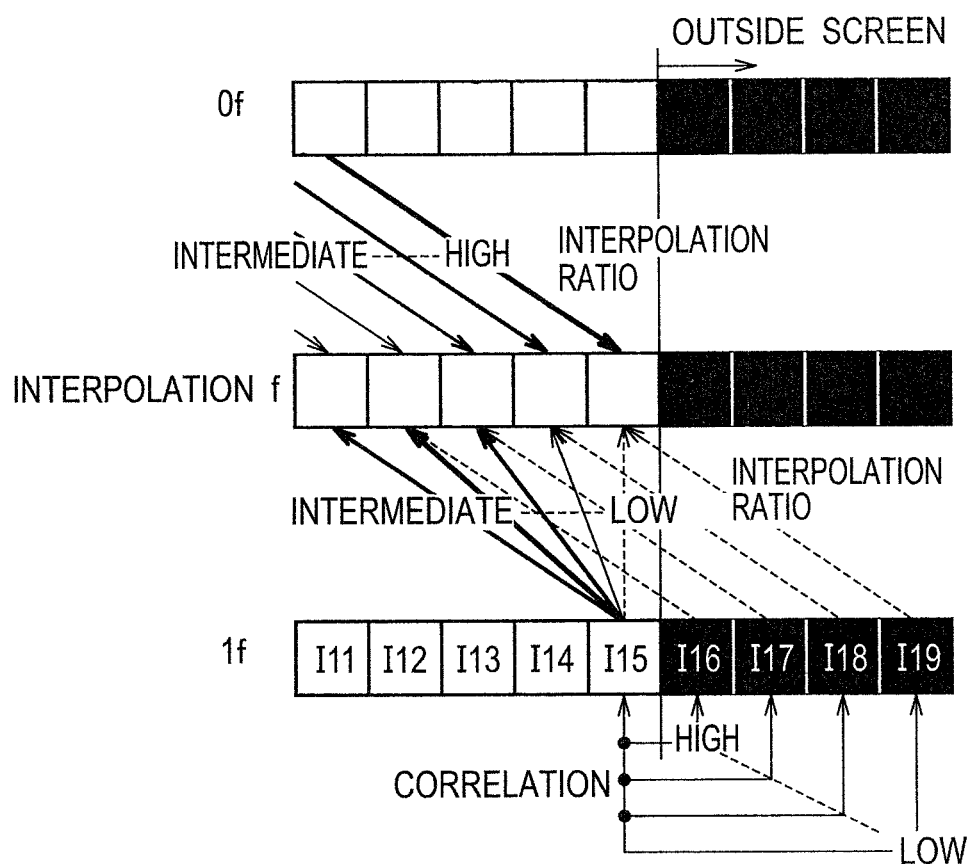
FIG. 9 is a drawing that illustrates an interpolation frame generation processing according to the fourth embodiment of the present invention.

A specific example is shown in FIG. 9. Here, similarly to FIG. 4, the outermost edge pixel I15 within the screen of the subsequent frame if and the four pixels I16 to I19 located outside the screen of the subsequent frame if have the correlations from being high to being low according to the mutual distances. That is, when a motion vector points the outside-screen pixel (for example, I16) which is close to the screen edge, the correlation between the outside-screen pixel I16 pointed by the motion vector and the screen-edge pixel I15 is high. Thus, in this case, the interpolation is carried out by using the previous frame 0f and subsequent frame if at a ratio close to that of the ordinary processing. According to the fourth embodiment, the interpolation pixel of the ordinary processing is generated at a mixture ratio of 1:1 between a pixel of the previous frame 0f becoming the interpolation source and a pixel of the subsequent frame 1f becoming the interpolation source. On the other hand, when the motion vector points the outside-screen pixel (for example, I19) that is away from the screen edge, the correlation between the outside-screen pixel I19 pointed by the motion vector and the screen-edge pixel I15 is low. Thus, in this case, the interpolation is carried out by lowering the ratio of the subsequent frame if where the motion vector points a region located outside the screen, than the ratio of the previous frame 0f.

As such, it is regarded that the correlation is lower as the distance between the outside-screen pixel originally pointed by the motion vector and the screen-edge pixel becomes greater. And it is made such that the use ratio of the frame regarded to have a low correlation is lowered relative to the interpolation ratio of the other frame.

As described above, with the image processing apparatus according to the fourth embodiment, it is so made that the interpolation ratio is controlled based on the motion vector and the screen edge. This increases the use ratio of the pixel having a high correlation and decreases the use ratio of the pixel having a low correlation, thereby making it possible to suppress the use of the pixel having low reliability and to make a gradual change of the correlation.

Further, here the interpolation ratio is controlled based on the distance between the screen-edge pixel and the outside-screen pixel which is pointed by the motion vector. However, the method of controlling the interpolation ratio is not limited to this. The interpolation ratio controller 109 may control the interpolation ratio based on the vector quantity of the motion vector. In this case, a similar effect can be achieved by considering that the correlation becomes lower as the vector quantity becomes larger. In another possibility, the interpolation ratio controller 109 may control the interpolation ratio based on a degree of accuracy or reliability in the detection of the motion vector. In this case, a similar effect can be achieved by considering that the correlation becomes lower as the accuracy or reliability becomes lower.

What is claimed is:

1. An image processing apparatus comprising:
   an input unit that inputs an input signal;
   a frame memory that frame-delays the input signal input by the input unit and outputs the input signal as a delayed input signal;
   a motion vector detector that detects a motion vector between frames based on the input signal input by the input unit and the delayed input signal;
   a screen edge detector that detects a pixel corresponding to a screen edge in the input signal input by the input unit;
   an interpolation frame generator that generates an interpolation frame from the input signal input by the input unit and the delayed input signal, based on the motion vector detected by the motion vector detector and the pixel corresponding to the screen edge detected by the screen edge detector; and
   an interpolation ratio controller that controls an interpolation ratio as a use ratio of an interpolation source frame, based on the motion vector detected by the motion vector detector and the pixel corresponding to the screen edge detected by the screen edge detector,
      wherein when the motion vector points a pixel located outside with respect to the pixel corresponding to the screen edge, the interpolation frame generator generates the interpolation frame using the pixel corresponding to the screen edge or a pixel located inside with respect to the pixel corresponding to the screen edge, and
   wherein the interpolation ratio controller controls the interpolation ratio based on any one of (1) a distance between the pixel corresponding to the screen edge detected by the screen edge detector and the pixel located outside with respect to the pixel corresponding to the screen edge and pointed by the motion vector and (2) a degree of accuracy or reliability in the detection of the motion vector.

2. The image processing apparatus according to claim 1, further comprising: a screen edge vector controller that controls, when the motion vector detected by the motion vector detector points the pixel located outside with respect to the pixel corresponding to the screen edge detected by the screen edge detector, the motion vector such that the motion vector points the pixel corresponding to the screen edge or the pixel located inside with respect to the pixel corresponding to the screen edge,
   wherein based on the motion vector controlled by the screen edge vector controller, the interpolation frame generator generates the interpolation frame using the pixel corresponding to the screen edge or the pixel located inside with respect to the pixel corresponding to the screen edge.

3. The image processing apparatus according to claim 1, wherein the screen edge detector detects, as the pixel corresponding to the screen edge, each of pixels corresponding to upper-lower and right-left edges of an effective pixel region in the input signal or each of pixels shifted inward by an arbitrary number of pixels from the pixels corresponding to the upper-lower and right-left edges of the effective pixel region in the input signal.

4. The image processing apparatus according to claim 1, further comprising:
   a black region detector that detects a black region within an effective pixel region in the input signal,
   wherein the screen edge detector detects, as the pixel corresponding to the screen edge, a pixel located inside with respect to the black region detected by the black region detector.

5. An interpolation frame generating method comprising:
   inputting an input signal;
   generating a delayed input signal from the input signal;
   detecting a motion vector between frames based on the input signal and the delayed input signal;
   detecting a pixel corresponding to a screen edge in the input signal;
   generating an interpolation frame from the input signal and the delayed input signal based on the motion vector detected by the motion vector detecting and the pixel corresponding to the screen edge detected by the screen edge detecting; and
   controlling an interpolation ratio as a use ratio of an interpolation source frame, based on the motion vector detected by the motion vector detecting and the pixel corresponding to the screen edge detected by the screen edge detecting,
      wherein when the motion vector points a pixel located outside with respect to the pixel corresponding to the screen edge, the interpolation frame generating generates the interpolation frame using the pixel corresponding to the screen edge or a pixel located inside with respect to the pixel corresponding to the screen edge, and
   wherein the interpolation ratio controlling controls the interpolation ratio based on any one of (1) a distance between the pixel corresponding to the screen edge detected by the screen edge detecting and the pixel located outside with respect to the pixel corresponding to the screen edge and pointed by the motion vector and (2) a degree of accuracy or reliability in the detection of the motion vector.

* * * * *